(12) United States Patent
Stapleton

(10) Patent No.: US 6,286,739 B1
(45) Date of Patent: Sep. 11, 2001

(54) ARTICLE CARRIER WITH STOWING CROSSRAILS

(75) Inventor: Craig Stapleton, Clarkston, MI (US)

(73) Assignee: SportRack LLC, Sterling Heights, MI (US)

( * ) Notice: Subject to any disclaimer, the term of this patent is extended or adjusted under 35 U.S.C. 154(b) by 0 days.

(21) Appl. No.: 09/491,011

(22) Filed: Jan. 25, 2000

Related U.S. Application Data

(60) Provisional application No. 60/156,546, filed on Sep. 29, 1999.

(51) Int. Cl.[7] ............................................ B60R 9/04
(52) U.S. Cl. ........................ 224/321; 224/309; 224/315
(58) Field of Search ................................ 224/309, 310, 224/314, 315, 317, 319, 320, 321, 322, 325, 326

(56) References Cited

U.S. PATENT DOCUMENTS

| | | | | |
|---|---|---|---|---|
| 4,416,406 | * | 11/1983 | Popeney | 224/314 |
| 4,473,178 | * | 9/1984 | Bott | 224/324 |
| 5,340,007 | * | 8/1994 | Jeuffray et al. | 224/321 |
| 5,377,890 | * | 1/1995 | Brunner et al. | 224/321 |
| 5,395,024 | * | 3/1995 | Luchtenberg | 224/321 |
| 5,511,709 | * | 4/1996 | Fisch | 224/321 |

* cited by examiner

Primary Examiner—Stephen K. Cronin
(74) Attorney, Agent, or Firm—Rader, Fishman & Grauer PLLC

(57) ABSTRACT

An article carrier assembly includes a pair of longitudinally laterally spaced siderails, each attachable to a vehicle roof panel, including a track and outboard corner portion. A pair of stanchions are attached to the tracks for slidable movement through a plurality of positions. A first crossrail is pivotally secured to a forward end of one of the siderails, and is movable between a stowed position and a deployed position. In the recessed position, the first crossrail is recessed in the siderail to which the first crossrail is attached. In the deployed position, the first crossrail is supported on both siderails. A second crossrail is pivotally attached to one of the stanchions opposite the siderail to which the first crossrail is attached. The second crossrail is rotatable between a stowed position, and a deployed position. In the stowed position, the second crossrail is recessed in the siderail and in the deployed position, the second crossrail is supported on both stanchions. When stowed, the crossrails generate a reduced amount of wind noise and vehicle drag.

9 Claims, 6 Drawing Sheets

US 6,286,739 B1

ARTICLE CARRIER WITH STOWING CROSSRAILS

RELATED APPLICATION

This application claims the benefit of U.S. provisional application serial No. 60/156,546 filed Sep. 29, 1999.

BACKGROUND OF THE INVENTION

1. Technical Field

The present invention relates generally to article carrier assemblies, and, more particularly, to an article carrier assembly for attachment to a vehicle roof panel with improved styling and functionality.

2. Description of the Related Art

Typical vehicle article carrier assemblies include a pair of siderails mounted to a vehicle roof panel with at least one crossrail extending therebetween. Retainers on opposing ends of the crossrail attach the crossrail to the siderails. The retainers are usually secured to the siderails by latches or other such mechanisms. The retainers, crossrails and latches, however, create design problems in that such components may be bulky, and it is difficult to combine trim styling with sufficient strength for supporting an article on the carrier assembly. This leads to disadvantages.

One disadvantage of conventional designs is that the crossrails create wind noise when the vehicle is driven. Wind noise is inevitable when the article carrier assembly is being used, due to the article itself. Nonetheless, this wind noise is undesirable, especially when the article carrier assembly is not being used. In addition, the crossrails increase vehicle drag. Finally, it is difficult to provide crossrails in the form of a trim rail for styling purposes without sacrificing structural integrity. Accordingly, the styling suffers.

One approach taken in the art to address some of the shortcomings described above involves providing removable crossrails. In this approach, the crossrails are removable, and may be stored, for example, in the vehicle owner's garage or the like when not in use. However, a significant shortcoming of this approach is that the crossrails are not always with the vehicle. Therefore, on those occasions where use of the article carrier assembly arises unexpectedly, the article carrier assembly cannot be used because the removable crossrails are not stored with the vehicle.

There is therefore a need to provide an improved article carrier assembly that reduces or eliminates one or more of the shortcomings set forth above.

SUMMARY OF THE INVENTION

One object of the present invention is to provide an article carrier assembly that reduces or eliminates wind noise and vehicle drag when not in use.

Another object of the present invention is to provide an article carrier assembly that presents stylishly when not in use.

The present invention achieves these and other objects, and overcomes the above-referenced shortcomings of conventional article carrier assemblies by providing crossrails that are stowed in corresponding siderails when the crossrails are not needed. This approach reduces both (i) buzz, squeak, and rattle (BSR), and (ii) noise, vibration, and harshness (NVH) associated with the article carrier assembly. The invention also minimizes vehicle drag. In addition, a fully functional article carrier assembly is self-contained. That is, the crossrails are always with the vehicle, even when the carrier assembly is not in use. Moreover, the present invention provides for improved styling inasmuch as the article carrier assembly, when the crossrails are stowed, conveys the look of stand-alone siderails.

A preferred embodiment of the inventive article carrier assembly is adapted for attachment to a vehicle roof panel. The assembly includes a pair of spaced siderails configured to be mounted to the roof panel. A crossrail is also provided, along with a first attachment arrangement. The first attachment arrangement is configured to secure a first end of the crossrail to one of the pair of siderails and allow movement of the crossrail between a stowed position and a deployed position. In the stowed position, the crossrail is stowed in the siderail to which it is attached. Preferably, the crossrail when in the stowed position is recessed in a channel provided in the siderail. In the deployed position, the crossrail is supported on both siderails.

In another embodiment, a second end of the crossrail opposite the first end is releasably attached to the other one of the pair of siderails. This attachment may include one of a threaded thumb wheel, a screw, a quarter-turn fastener, and an over-center clamping system.

In a still further embodiment, a pair of crossrails are provided wherein a first, front crossrail, when in a deployed position, is longitudinally fixed with respect to the vehicle. The rear crossrail, however, is longitudinally adjustable with respect to the vehicle. Providing adjustability for only one of the crossrails (rather than for both crossrails) has the advantage of reducing the cost of the article carrier assembly. In addition, such an arrangement forces the end user to load the article carrier assembly properly (i.e., from the forward portion of the carrier assembly). To provide this adjustability, the article carrier assembly includes a pair of stanchions slidably attached to a track portion of the siderails.

BRIEF DESCRIPTION OF THE DRAWINGS

The above objects and other objects, features and advantages of the present invention will be readily apparent from the following detailed description of the best modes of carrying out the invention, when read in connection with the accompanying drawings in which like reference characters refer to like parts throughout the views, and in which.

DETAILED DESCRIPTION OF THE PREFERRED EMBODIMENTS

Figure 1:
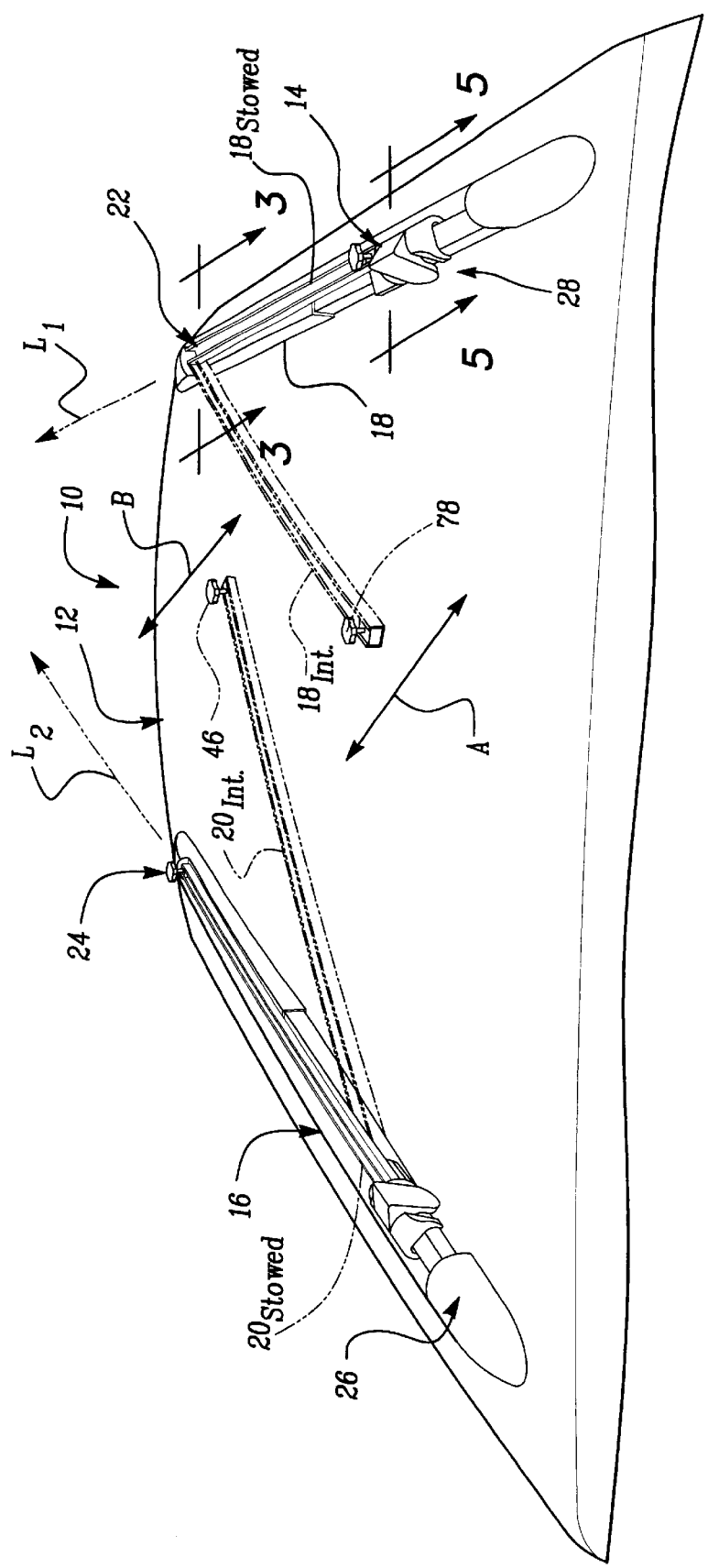
FIG. 1 is a perspective view of an article carrier assembly in accordance with the present invention, showing a pair of crossrails in a stowed and in a partially deployed position.

FIG. 1 shows a partial, perspective view of an article carrier assembly 10 secured to a vehicle roof panel 12. Article carrier assembly 10 includes a first siderail 14, a second siderail 16, a first crossrail 18, a second crossrail 20, a first attachment arrangement 22, a second attachment arrangement 24, a first stanchion 26, and a second stanchion 28.

First and second siderails 14, 16 are configured to be mounted to vehicle roof panel 12. First and second siderails 14, 16 are disposed generally along respective longitudinal axes designated L1 and L2, and are transversely spaced apart, one from the other. As described below, siderails 14, 16 are adapted to alternatively "stow" and support crossrails 18, 20. Siderails 14 and 16 are substantially identical. Each siderail 14, 16 includes a respective forward and rearward portion. The rearward portion includes a track, described in greater detail below, for allowing slidable movement of stanchions 26, 28.

Crossrails 18, 20 are configured to support articles, such as luggage and the like. In one embodiment, crossrails 18, 20 comprises lightweight metal, such as aluminum, to obtain needed strength objectives (i.e., to support articles), while remaining sufficiently light for easy movement. While the embodiment illustrated in FIG. 1 includes two crossrails 18, 20, other embodiments may include a greater or lesser number of crossrails.

First attachment arrangement 22 is configured generally to secure a first end of crossrail 18 to siderail 14 and allow movement, shown generally in the direction of the double-arrowhead line designated "A" in FIG. 1. In particular, crossrail 18 is allowed to move between a stowed position, designated $18_{STOWED}$ (shown in solid-line), and a deployed position, designated $18_{DEPLOYED}$ (best shown in FIG. 2) away from stowed position $18_{STOWED}$. Crossrail 18 in the stowed position $18_{STOWED}$ is preferably recessed for storage in a channel portion of first siderail 14. Crossrail 18 may be moved to the stowed position, for example, when the article carrier assembly is not used. FIG. 1 further shows an intermediate position of crossrail 18 (shown in phantom-line format), designated $18_{INT}$, which is between the stowed and deployed positions.

Likewise, second crossrail 20, in combination with stanchion 26, is configured for movement in the direction of the double-arrowhead line designated "B" in FIG. 1. Such movement is also between a stowed position, designated $20_{STOWED}$ (shown in FIG. 1 in solid-line format), and a fully deployed position, an exemplary position being designated $20_{DEPLOYED(1)}$ (best shown in FIG. 2). Crossrail 20 in the stowed position $20_{STOWED}$ is preferably recessed for storage in a channel portion of second siderail 16. FIG. 1 further shows an intermediate position of crossrail 20 (shown in phantom-line format), designated $20_{INT}$, which is between the stowed and deployed portions. The movement of crossrails 18 and 20 may be reversed.

Second attachment arrangement 24 is configured generally to releasably secure crossrail 20 to a forward end of second siderail 16 when crossrail 20 is in the stowed position $20_{STOWED}$. In a preferred embodiment, second attachment arrangement 24 is configured such that crossrail 20 may be alternately secured and released without the use of any tools (i.e., the user can operate the attachment arrangement with his or her hands). Of course, this feature, while advantageous, is exemplary and not limiting in nature.

Figure 2:
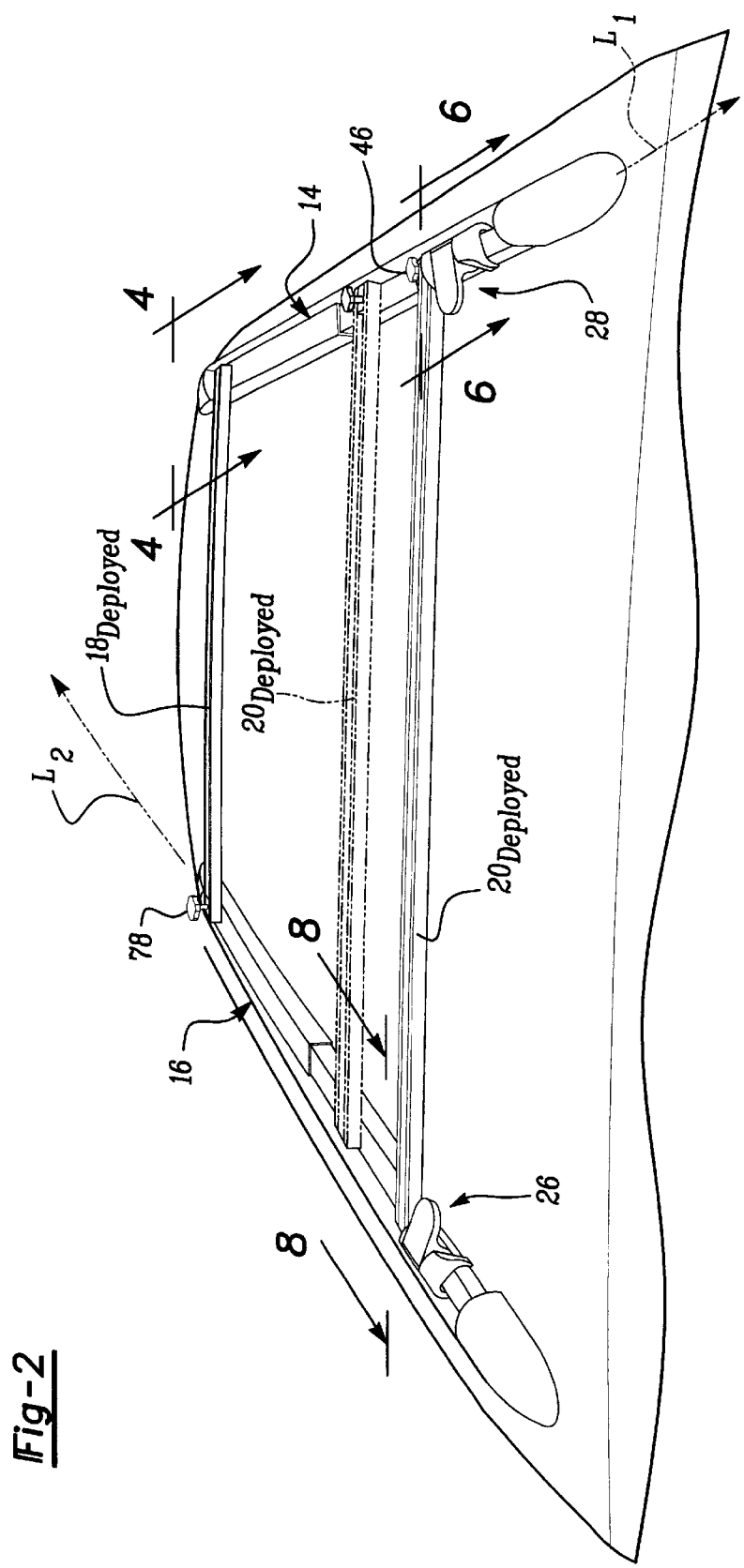
FIG. 2 is a perspective view of the article carrier assembly of FIG. 1 showing the crossrails in a fully deployed position.

Referring to FIG. 2, stanchions 26, 28 are configured generally to support and secure rear crossrail 20 when crossrail 20 is deployed. Stanchions 26, and 28 are slidably movable with respect to siderails 16 and 14, respectively. This movement allows crossrail 20 to be positioned at any one of a plurality of positions along the siderails 14, 16. For example, FIG. 2 shows a fully deployed crossrail 20 at a first longitudinal position, designated $20_{DEPLOYED(1)}$, and at a second longitudinal position, designated $20_{DEPLOYED(2)}$. FIG. 2 also shows first crossrail 18 in a fully deployed position, $18_{DEPLOYED}$.

Figure 3:
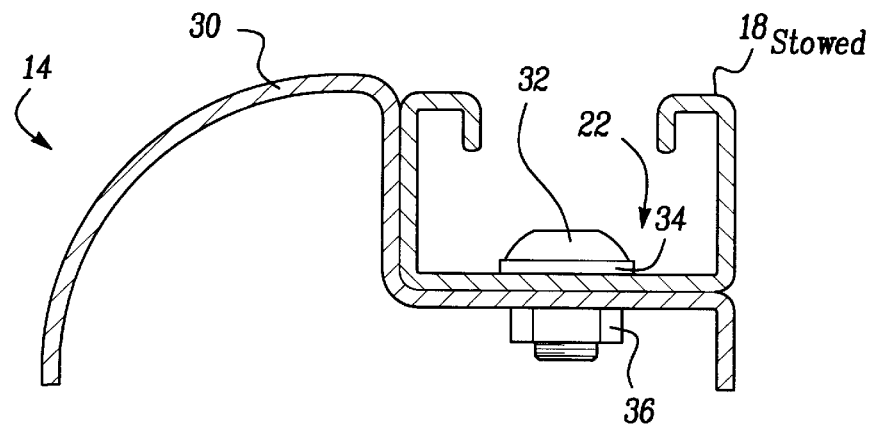
FIGS. 3–4 are cross-section views showing an attachment arrangement for securing a forward crossrail to a predetermined, fixed position along a first siderail.
Figure 4:
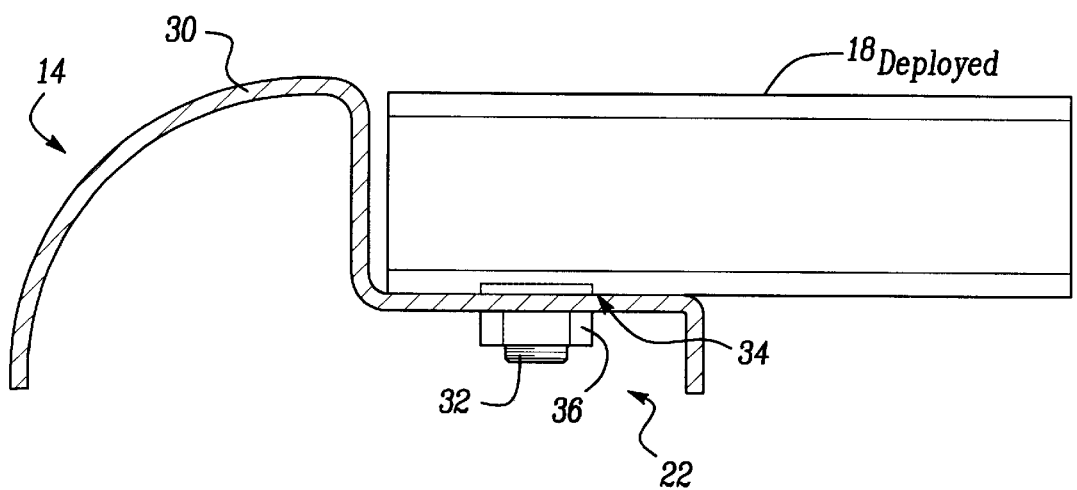

FIG. 3 and 4 show siderail 14, and first attachment arrangement 22 in greater detail. FIG. 3 is a cross-section view taken substantially along lines 3—3 in FIG. 1, which is taken through the forward portion of siderail 14. The forward portion (with respect to the vehicle) of siderail 14 includes an outboard portion 30. Outboard portion 30 is shaped so as to define a side-opening channel. The side-opening channel is configured so that crossrail 18 may be recessed therein. Outboard portion 30 is formed, in one embodiment, of roll form metal, such as aluminum. Other materials such as plastics and the like may also be used to make siderail 14. In the illustrated embodiment, the forward portion of siderail 16 is the same as the forward portion of siderail 14.

FIG. 3 also shows, in greater detail, first attachment arrangement 22. Attachment arrangement 22 includes, in the illustrated embodiment, a threaded fastener such as a bolt 32, a bushing 34, and a nut 36. Bolt 32, bushing 34 and nut 36 pivotally secure one end of crossrail 18 to siderail 14 at a predetermined, fixed, longitudinal position (with respect to axis $L_1$) along siderail 14. The predetermined position is near a forward end of siderail 14. Other known structures for pivotally securing crossrail 18 to siderail 14 may be employed to implement the above-described function.

FIG. 4 is a vertical, cross-sectional view taken substantially along lines 4—4 in FIG. 2. As shown, attachment arrangement 22 is configured to allow crossrail 18 to rotate from the stowed position to the deployed position about the predetermined, fixed position on siderail 14.

Figure 5:
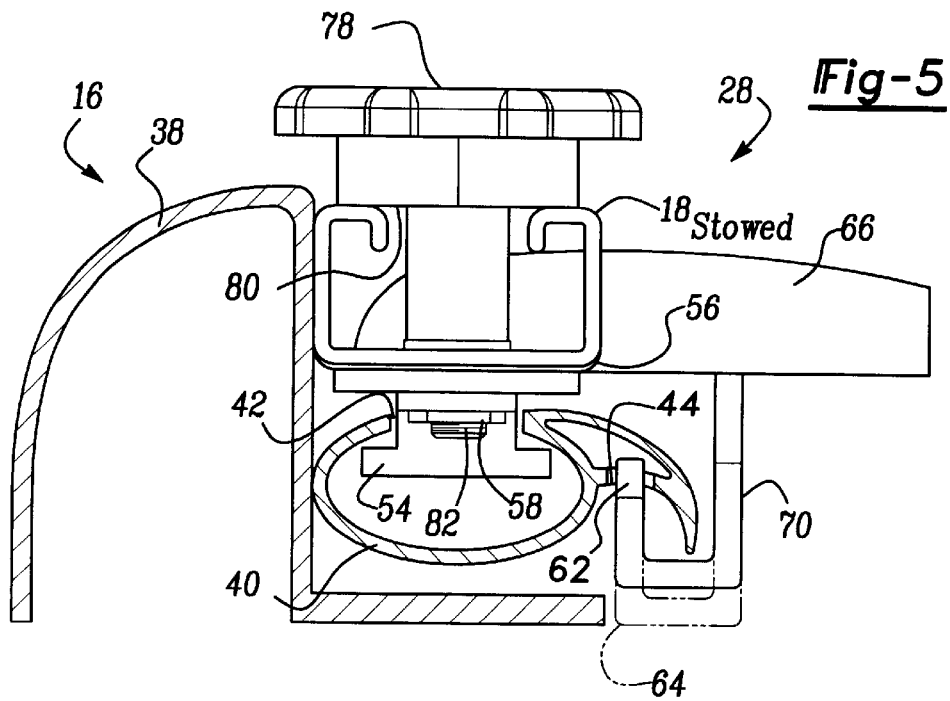
FIGS. 5–6 are cross-section views of a stowed crossrail, and a deployed crossrail, respectively attached to a movable stanchion.

FIG. 5 is a vertical, cross-sectional view taken substantially along lines 5—5 in FIG. 1, which is taken through the rearward portion of siderail 14. In the illustrated embodiment, the rearward portion of siderail 16 is substantially the same as the rearward portion of siderail 14. Rearward portion of siderail 14 includes an outboard portion 38. Outboard portion 38 is shaped so as to form an extension of the above-described side-opening channel. Outboard portion 38 may be made from roll form metal, such as aluminum. In addition, rearward portion of siderail 16 further includes an elongated track 40 having a longitudinally extending slot 42 formed through an upper wall thereof, and a plurality of apertures 44 configured for use in indexing movable stanchion 26 through various positions along siderail 16.

Figure 6:
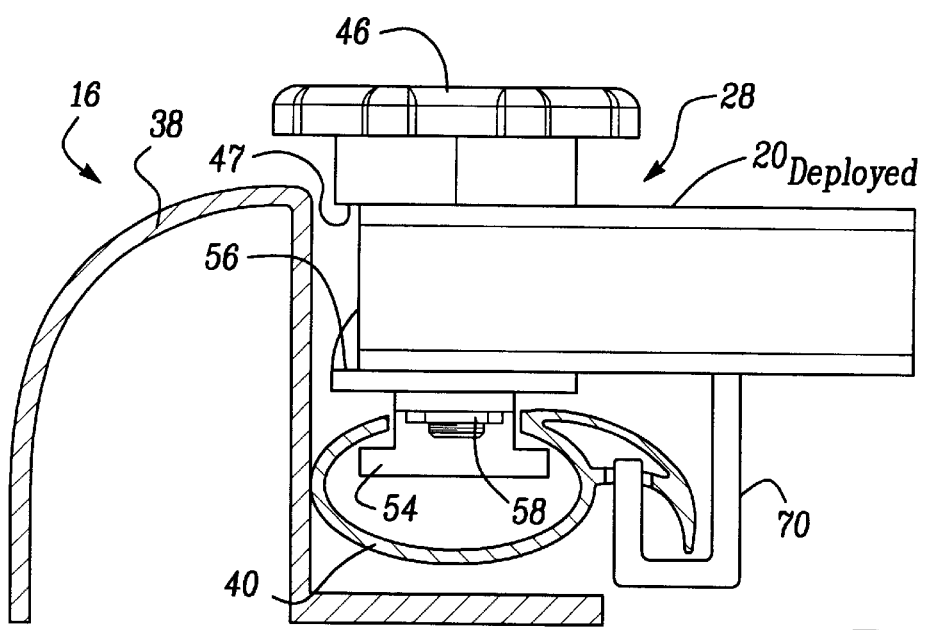

FIG. 6 shows second attachment arrangement 24 in greater detail when crossrail 20 is deployed. Arrangement 24 includes a thumbwheel 46 having a threaded shaft portion thereof and an annular flange portion 47. Flange 47 bears against a top surface of crossrail 20 when tightened, holding crossrail 20 in place. Since threaded thumbwheel 46, by its nature, may be tightened or loosened by simply reversing the direction of rotation (e.g., either clockwise (CW) or counterclockwise (CCW)), it provides the means for releasably securing crossrail 20 to siderail 14, when crossrail 20 is deployed. It should be understood that variations of arrangement 24 are possible, and which may comprise one of a screw, a quarter-turn fastener, or an over-center clamping system.

Figure 7:
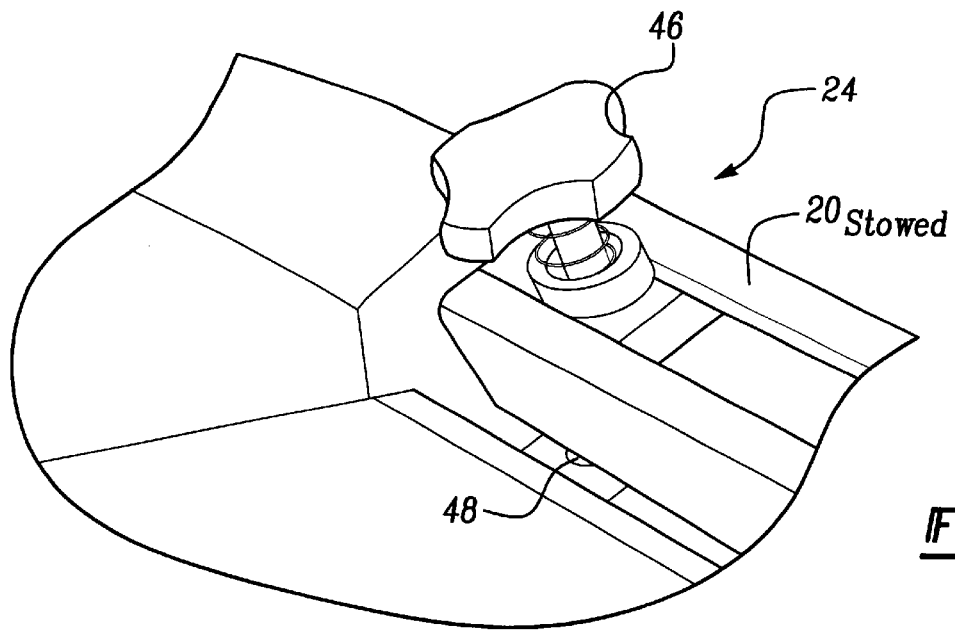
FIG. 7 is a perspective view of a rear crossrail in a stowed position, particularly illustrating a releasable attachment arrangement.

FIG. 7 shows second attachment arrangement 24 (e.g., thumbwheel 46) when crossrail 20 is in the stowed position $20_{STOWED}$. In the stowed position, thumbwheel 46, particularly threaded shaft portion thereof, cooperates with a threaded nut 48 mounted to siderail 16, to provide the means for releasably securing crossrail 20 to siderail 16.

Figure 9:
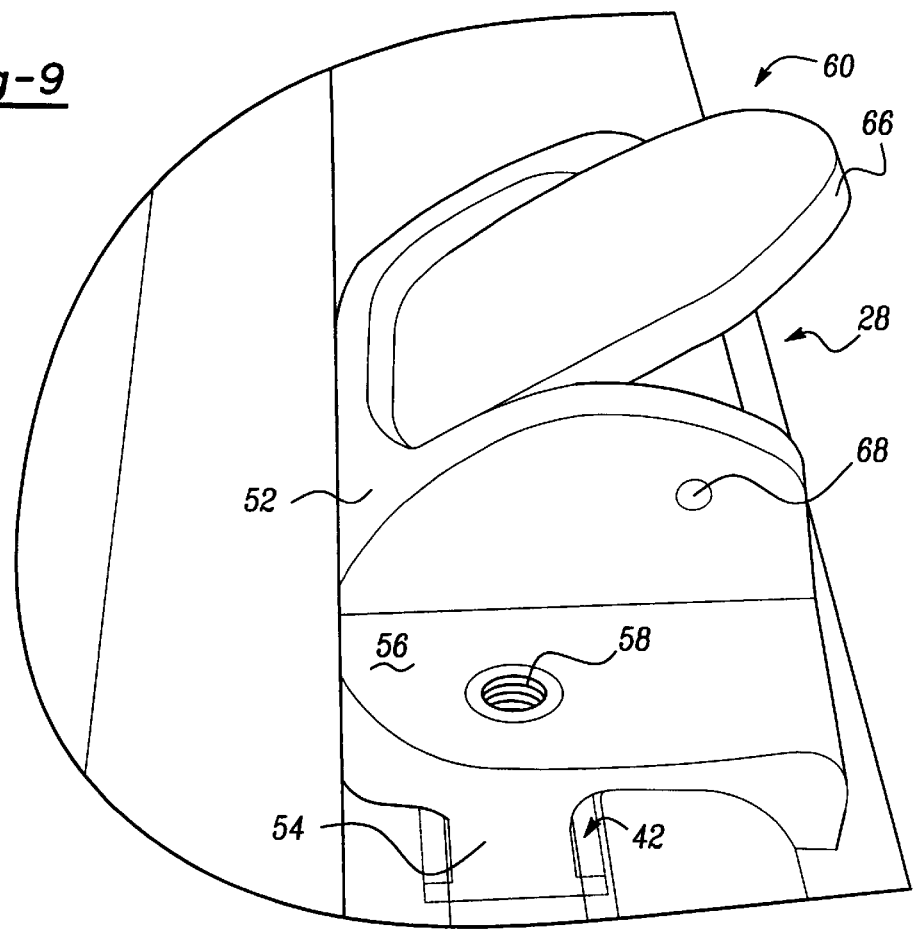
FIG. 9 is a top, perspective view showing a second movable stanchion.
Figure 10:
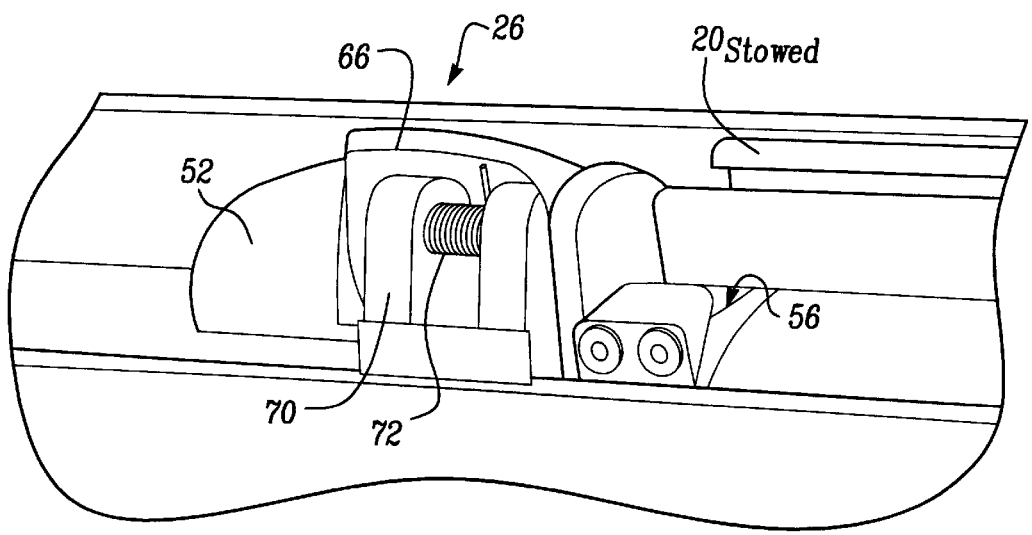
FIG. 10 is a side, perspective view of the first movable stanchion of FIG. 8.

FIGS. 5 and 6 also show stanchion 28 in greater detail, with portions thereof omitted for clarity. As described above, stanchions 26, 28 are movably attached to respective siderails 14, 16, which provide a mechanism for adjusting the longitudinal position of the rear crossrail 20. Stanchions 26 and 28 are substantially identical in one embodiment. Unless described to the contrary, the description of stanchion 28 applies equally to stanchion 26. Stanchion 28 includes a main body portion 52 (best shown in FIG. 9), a foot portion 54, a land portion 56 (best shown in FIG. 9), a fastener, such as a press-fit nut 58, and releasable locking means 60 having a locked position 62 and an unlocked position 64 comprising an over-center clamping system. Means 60 may include a hand-actuated handle 66, a pivot 68, (best shown in FIG. 9), a jaw assembly 70, and a torsion spring 72 (best shown in FIG. 10).

Body portion 52 may comprise thermoplastic material such as, for exemplary purposes only, thermoplastic olefin (TPO) material, but can be made of a wide variety of materials. Foot portion 54 is configured in shape and size to be received in slot 42 of track 40 to thereby allow slidable, generally longitudinal movement of stanchion 28 through a plurality of positions along siderail 14. Land portion 56 is configured generally to support crossrail 18 in the stowed position $18_{STOWED}$, as shown in FIG. 5. Land portion 56 is also configured to support crossrail 20 in the deployed position $20_{DEPLOYED}$, as shown in FIG. 6.

Means 60 is configured for releasably locking stanchion at a fixed position along a siderail. For indexing stanchion 28 along siderail 16, handle 66 is pivotally mounted to body portion 52 at pivot pin 68 (best shown in FIG. 9) to effect a generally upward and downward movement of jaw assembly 70. In order to secure stanchion 28 to track 40, handle 66 is moved to the locked position 62. In locked position 62, the distal portion of jaw assembly 70 engages predetermined apertures 44. To disengage stanchion 28 to thereby allow slidable movement of stanchion 28 along siderail 14, handle 66 is moved relatively in a downward direction. This downward movement is against a built-in spring bias provided by torsion spring 72 (best shown in FIG. 10). When handle is moved downward, a distal portion of jaw assembly 70 assumes unlocked position 64, shown in dashed-line format in FIG. 5. In unlocked position 64, stanchion 28 may be moved along track 40, generally in a direction along axis $L_1$, to any desired position.

Figure 8:
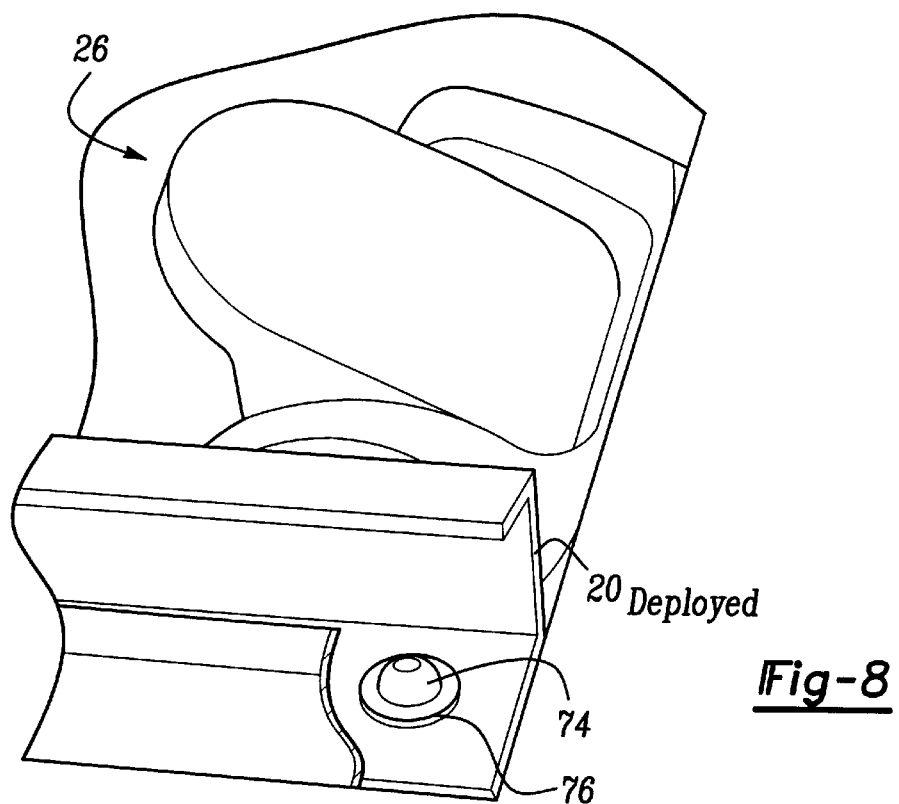
FIG. 8 is a perspective view showing the rear crossrail of FIG. 7 in a deployed position attached to a first movable stanchion.

FIG. 8 shows a feature of stanchion 26 not provided on stanchion 28 in the illustrated embodiment, a generally fixed pivoting arrangement. In particular, threaded nut 58 is configured to mesh with the corresponding outside threaded portion of a fastener, such as a bolt 74 or the like. A bushing 76 is also provided to lessen friction during rotation. The arrangement of bolt 74, bushing 76, and nut 58, in stanchion 26, is operative to pivotally attach crossrail 20 to stanchion 26. The nature of the attachment is such that a pivoting action is permitted to allow crossrail 20 to be moved between deployed and stowed positions. This function is similar to that performed by first attachment arrangement 22 with respect to crossrail 18.

FIG. 5 shows a further attachment arrangement, which is applied for releasably attaching crossrail 18 to stanchion 28.

In the illustrated embodiment, such arrangement comprises a thumbwheel 78. Thumbwheel 78 includes an annular flange portion 80 that bears on an upper surface of crossrail 18. The thumbwheel 78 further includes a lower, shaft portion 82 having outside threads configured to mesh with the inner threads of nut 58. This arrangement is shown for when crossrail 18 is stowed. When crossrail 18 is deployed, thumbwheel 78 cooperates with nut 48 (FIG. 7) to releasably secure crossrail 18 to the siderail. Like thumbwheel 46 of second attachment arrangement 24, thumbwheel 78 is configured such that crossrail 18 may be alternately secured and released without the use of any tools (i.e., the user can operate the attachment arrangement with his or her hands). Of course, other arrangements, such as a screw, a quarter-turn fastener, on an over-center clamping system may be employed to achieve the same functionality. In such alternative embodiments, stanchion 28 may not require threaded nut 58.

An article carrier assembly according to the invention reduces wind noise and vehicle drag when not in use by providing a stowing feature, where the two crossrails are stowed in respective siderails, generally out of sight. When needed, each crossrail may be rotated to a deployed position supported on both siderails. In this way, the crossrails may be kept with the vehicle, allowing full use of the carrier assembly at all times.

While the best mode for carrying out the invention has been described in detail, those familiar with the art to which this invention pertains will recognize various alternative designs and embodiments for practicing the invention within the scope of the appended claims.

What is claimed:

1. An article carrier assembly for attachment to a vehicle roof panel, comprising:

a first and a second spaced siderail configured to be mounted to said roof panel;

a crossrail having a first end, a first attachment arrangement including a pivot and configured to secure said first end of said crossrail to said first siderail and allow movement of said crossrail between a stowed position, in which said crossrail is stowed in said first siderail, and a deployed position away from said stowed position, said first attachment arrangement comprising a stanchion having a foot portion received in a slot of said first siderail to thereby allow slidable movement of said first end of said crossrail through a plurality of positions along said first siderail, said stanchion further including means for releasably fixing said stanchion at one of said plurality of positions along said first siderail to substantially fix said first end of said crossrail at a predetermined position on said first siderail, and a second attachment arrangement configured to releasably attach a second end of said crossrail to said second siderail.

2. The article carrier of claim 1, wherein said pivot comprises a fastener threaded on a portion thereof and configured to pivotally secure said crossrail to said first siderail at said predetermined position.

3. The article carrier of claim 1, wherein said pivot is disposed near a forward end of said first siderail.

4. The article carrier of claim 1, wherein said second attachment arrangement comprises one of a threaded thumbwheel, a screw, a quarter-turn fastener, and an over-center clamping system.

5. The article carrier of claim 4, wherein said means for releasably fixing comprises an over-center system.

6. An article carrier assembly for attachment to a vehicle roof panel, comprising:
- a first and a second spaced siderail having respective first and second longitudinal axes associated therewith, said siderails being configured to be mounted to said roof panel;
- a first and a second crossrail, each having a first end;
- a first attachment arrangement configured to secure said first end of said first crossrail to said first siderail and allow rotation of said first crossrail between a stowed position wherein said first crossrail is stowed in said first siderail and a deployed position away from said stowed position, said first attachment arrangement including a pivot configured to substantially fix said first end of said first crossrail at a predetermined position on said first siderail;
- a first stachion slidably coupled to said second siderail for movement through a plurality of positions along said second siderail, said first end of said second crossrail being pivotally secured to said stanchion to allow rotation of said second crossrail between respective stowed and deployed positions; and
- a second stanchion slidably coupled to said first siderail for movement through a plurality of positions along said first siderail, said first crossrail being supported on said first and second siderails when said first crossrail is in said deployed position, said second crossrail being supported on said first and second stachions when said second crossrail is in said deployed position.

7. An article carrier assembly for attachment to a vehicle roof panel, comprising:
- a first and a second spaced siderail having respective first and second longitudinal axes associated therewith, said siderails being configured to be mounted to said roof panel;
- a first and a second crossrail, each having a first end;
- a first attachment arrangement configured to secure said first end of said first crossrail to said first siderail and allow rotation of said first crossrail between a stowed position wherein said first crossrail is stowed in said first siderail and a deployed position away from said stowed position, said first attachment arrangement including a pivot configured to substantially fix said first end of said first crossrail at a predetermined position on said first siderail;
- a first stanchion slidably coupled to said second siderail for movement through a plurality of positions along said second siderail, said first end of said second crossrail being pivotally secured to said stanchion to allow rotation of said second crossrail between respective stowed and deployed positions; and
- a second stanchion slidably coupled to said first siderail for movement through a plurality of positions along said first siderail, said first crossrail being supported on said
- wherein said first crossrail is supported on said first and second siderails and said second crossrail being supported on said first and second stanchions in respective deployed positions; and
- a pair of second attachment arrangements configured to releasably attach a second end of each of said first and second crossrails to said second siderail and to said second stanchion, respectively, said second attachment arrangement comprising one of a threaded thumbwheel, a screw, a quarter-turn fastener, and an over-center clamping system.

8. The article carrier of claim 7, wherein said first and said second stanchion are equipped with locking means releasably fixing said first and said second stanchion at a selected position of said plurality of positions along said first and said second siderails.

9. The article carrier of claim 8, wherein said locking means comprises one of a hand-actuated handle, a pivot, a jaw assembly, and a torsion spring.

* * * * *